United States Patent [19]
Hardwick et al.

[11] 3,744,848
[45] July 10, 1973

[54] CONTROL VALVE
[75] Inventors: David R. Hardwick, Maryland Heights; Raymond J. Kersting, Dellwood, both of Mo.
[73] Assignee: Wagner Electric Corporation, Newark, N.J.
[22] Filed: Sept. 7, 1971
[21] Appl. No.: 178,010

[52] U.S. Cl. .................................... 303/9, 137/107
[51] Int. Cl. ............................................ B60t 13/10
[58] Field of Search ......................... 303/9, 29, 40; 137/107

[56] References Cited
UNITED STATES PATENTS
3,314,438   4/1967   Ike ............................................. 303/9
2,986,153   5/1961   Putnam ..................................... 303/29

Primary Examiner—George E. A. Halvosa
Attorney—Joseph E. Papin

[57] ABSTRACT

A control valve is provided in a fluid pressure system with selectively operable means for controlling the application of fluid pressure from separate sources thereof to a spring setting, pressure released actuator for energizing a brake in an air brake system, and resiliently urged means are provided in said control valve to drive said selectively operable means to a position automatically venting said actuator and energizing said brake upon the occurrence of a predetermined low pressure at one of said sources. A uni-directional flow valve is provided in the control valve to prevent the reduction of fluid pressure at the brake actuator and the gradual spring setting energization of the brake prior to the automatic actuation of the selectively operable means by said resiliently urged means in response to the predetermined low pressure at the one source.

1 Claim, 4 Drawing Figures

INVENTORS:
RAYMOND J. KERSTING
DAVID R. HARDWICK
BY Joseph E. Papin

CONTROL VALVE

BACKGROUND OF THE INVENTION

In the past, tripping or automatically actuated push-pull type control valves have been utilized in fluid pressure systems for controlling the application of service and emergency fluid pressure to a spring setting, pressure released actuator and the exhaustion of such applied fluid pressure therefrom to respectively deenergize and energize a brake operatively connected with said actuator. One of the main undesirable or disadvantageous features of such past tripping type control valves which sensed the service fluid pressure for tripping purposes was that in the event of service fluid pressure depletion such control valves permitted the corresponding depletion of service fluid pressure from the brake actuator effecting a partial or dragging spring set energization of the brake prior to the automatic or tripping function of said control valve to effect a complete spring setting energization of said brake by said actuator.

SUMMARY OF THE INVENTION

The principle object of the present invention is to provide a brake system and control valve therefor which overcomes the aforementioned undesirable and disadvantageous feature of such past systems and control valves, and this, as well as other objects and advantageous features of the present invention, will become apparent hereinafter.

Briefly, the invention includes a brake system having a pair of fluid pressure sources, a brake, a spring setting, pressure released actuator connected with said brake and responsive to fluid pressure applied thereto from one of said sources less than a predetermined value to effect a spring setting energization of said brake, and means for controlling the application of fluid pressure from said sources to said actuator including unidirectional valve means for isolating the applied fluid pressure from the fluid pressure at said one source in the event of a fluid pressure failure at said one source. The invention also includes a control valve having selectively operable means for controlling the application therethrough of separate supplied fluid pressures, other means automatically actuated in response to a predetermined minimum value of one of the supplied fluid pressures for venting the applied fluid pressure to the atmosphere, and uni-directional valve means for preventing the depletion of the applied fluid pressure along with the one supplied fluid pressure prior to the automatic actuation of said other means.

DESCRIPTION OF THE DRAWINGS

In the drawings which illustrate embodiments of the present invention and wherein like numerals refer to like parts wherever they occur.

Figure 1:
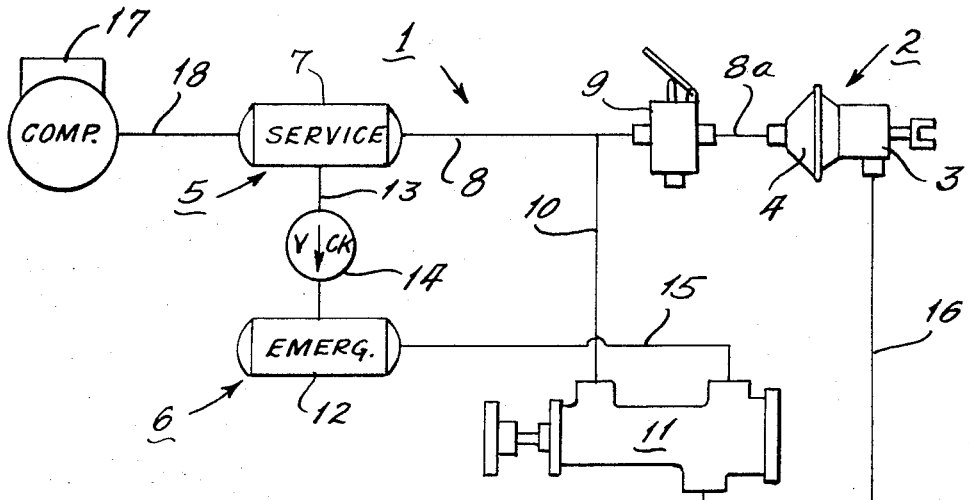
FIG. 1 is a schematic of a fluid pressure system embodied in the present invention.

Referring now to the drawings in detail and in particular to FIG. 1, a dual fluid pressure or brake system 1 is shown for use on a vehicle having at least one spring setting fluid pressure released brake cylinder or actuator 2 of a type well known in the art and including an emergency or spring set portion 3 and a service or fluid pressure responsive or motor portion 4 for controlling the energization of a vehicle brake (not shown) operatively connected therewith. The system 1 is provided with service and emergency branches, indicated generally at 5, 6, and said service branch includes a service fluid pressure source or reservoir 7 connected with the fluid pressure responsive motor 4 of the brake actuator 2 by conduits 8, 8a having the inlet and outlet sides of an operator actuated foot or application valve 9 of a type well known in the art serially connected therebetween, and another conduit 10 is connected between the conduit 8 and one of the inlet ports of a push-pull type control valve 11. The emergency branch 6 includes an emergency fluid pressure source or protected reservoir 12 which is connected with the service reservoir 7 by a conduit 13 having a uni-directional flow or check valve 14 interposed therein, and another conduit 15 is connected between said emergency reservoir and the other inlet port of the control valve 11. To complete the description of the system 1, another conduit 16 is connected between the outlet or delivery port of the control valve 11 and the spring set portion 3 of the brake actuator 2, and a compressor 17 is connected with the service reservoir by a conduit 18.

Figure 2:
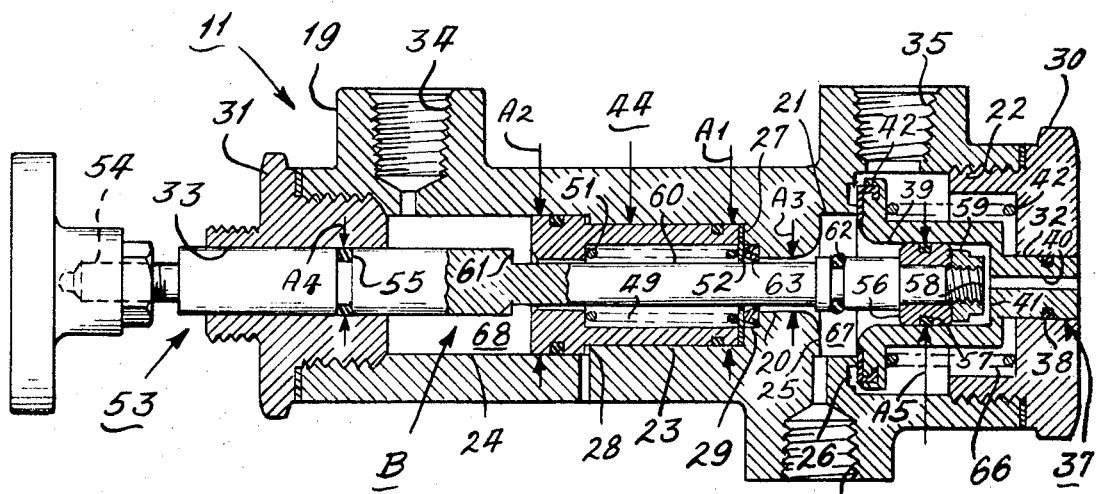
FIG. 2 is a sectional view illustrating the control valve of FIG. 1 also embodied in the present invention in cross-section.
Figure 3:
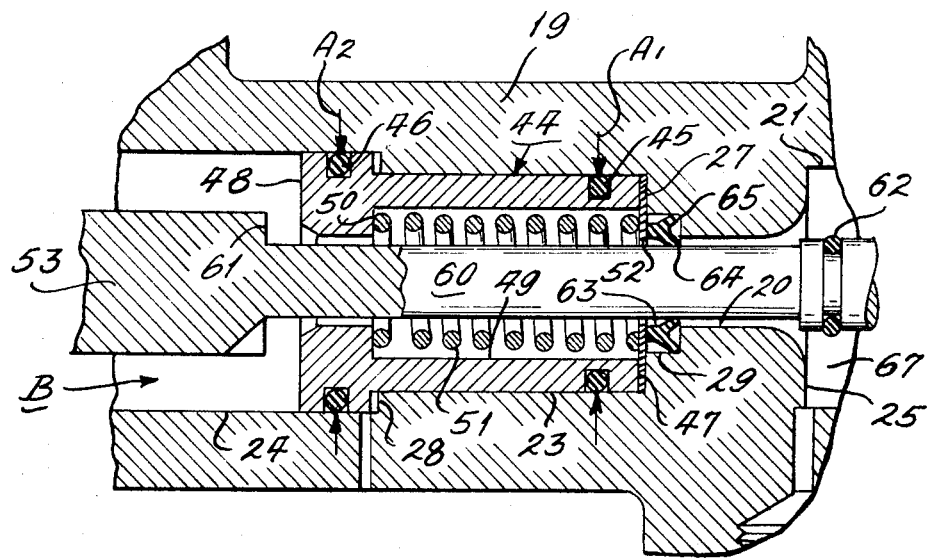
FIG. 3 is an enlarged fragmentary view taken from FIG. 2 and showing the uni-directional valve construction thereof.

Referring now to FIGS. 2 and 3, the control valve 11 is provided with a housing 19 having a bore 20 therein axially interposed between opposed stepped counterbores 21, 22 and 23, 24. Shoulders 25, 26 are provided on the housing 19 between the bore and counterbore 20, 21 and the counterbores 21, 22, respectively, said shoulder 26 defining a valve seat, and shoulders 27, 28 are defined on said housing between the bore and counterbore 20, 23 and the counterbores 23, 24, respectively. An annular recess or cup receiving groove 29 is provided in the housing shoulder 27, and opposed closure members or end caps 30, 31 having bores 32, 33 therethrough are threadedly received in the open ends of counterbores 22, 24, respectively. A pair of inlet or service and emergency ports 34, 35, which receive conduits 10, 15 as previously mentioned, are provided in the housing 19 intersecting with counterbores 24, 22 adjacent to the closure members 30, 31, respectively, and an outlet port 36, which receives the conduit 16 as previously mentioned, is also provided in said housing intersecting with the counterbore 21 adjacent to the shoulder 25.

An emergency valve or application member, such as the stepped piston 37, is slidably received in the closure member bore 32 having a peripheral seal 38 in sealing engagement therewith, and an exhaust passage, such as the stepped bores 39, 40, is axially provided through said piston having an annular shoulder or abutment 41 therebetween. A valve spring 42 is biased between the closure member 30 and valve piston 37, and an annular valve means or seal 42 which is carried on said valve piston about the stepped bore 39 is normally urged into sealing engagement with the housing valve seat 26 by the compressive force of said valve spring to interrupt pressure fluid communication between the inlet and outlet ports 35, 36.

An automatic actuating or resiliently urged member, such as the stepped control piston 44 is slidably received in the housing counterbores 23, 24 carrying peripheral seals 45, 46 respectively in sealing engagement therewith. The control piston 42 is provided with opposed ends or abutment portions 47, 48, and a stepped passage or bore 49 which defines an annular shoulder or abutment 50 on said control piston extends axially therethrough intersecting with said opposed ends. A spring 51 for automatically actuating the control piston 44, as described hereinafter, is compressed between the control piston shoulder 50 and an annular retainer 52 urging said retainer into engagement with the housing shoulder 27 and urging said control piston leftwardly in a direction away from its inoperative position engaged with the housing shoulder 28.

A selectively operable valve or application member, such as the push-pull rod indicated generally at 53 which is shown in its intermediate or mid-position, is provided with an exteriorly extending, operator applied force receiving portion, such as the knob 54, and said rod is slidably received in the closure member bore 33 carrying a peripheral seal 55 in sealing engagement therewith. A radially extending flange or exhaust valve member, such as the piston 56, is slidably received in the piston member stepped bore 39 carrying a peripheral seal or exhaust valve 57 for sealing engagement therewith to interrupt pressure fluid communication between the outlet port 36 and the exhaust port or piston member stepped bore 40, and said flange is retained on the interior or free end 58 of the push rod 53 against displacement by a nut 59 threadedly received thereon, said rod free end being drivingly engageably with the piston member shoulder 41. The piston member stepped bore 39 defines a valve seat for the valve member 57. The rod 53 is also provided with a reduced intermediate portion or extension 60 which defines a shoulder or abutment 61 on said rod for abutting or driving engagement with the control piston end 48, and said reduced portion extends coaxially through the control piston passage 49, the housing recess 29, and the housing bore 20 into the housing counterbore 21. An O-ring seal or valve member 62 is carried on the rod 53 between the flange 56 and reduced intermediate portion 60 thereof for sealing engagement with the housing bore 20 which defines a valve seat therefor.

An annular cup, such as the uni-directional flow valve member or check valve 63, is provided in the housing recess 29 being seated against displacement therefrom by the annular retainer 52 and having radially spaced inner and outer lips 64, 65 for sealing engagement with the annular outer wall of said recess and the reduced intermediate portion 60 of the rod 53, respectively, and in this manner the check valve 63 permits pressure fluid flow only in the direction from the inlet port 34 to the outlet port 36.

It should be noted that opposed, annular, effective areas $A_1$, $A_2$ are provided on the control piston 44 defined by the sealing engagements of the seals 45, 46 with the housing counterbores 23, 24 and subjected to the fluid pressure at the inlet port 34 at all times. Another effective area $A_3$ is defined on the rod 53 by the sealing engagement of the seal 62 with the housing bore or seat 20, and when sealably engaged therewith, the area $A_2$ is subjected to the fluid pressure at the outlet port 36. Opposed effective areas $A_4$, $A_5$ on the rod 53 which are defined by the sealing engagements of the seals 55, 57 with the closure member bore 33 and the piston member bore 39 are substantially equal and respectively subjected to the fluid pressures at the inlet and outlet ports 34, 36; however, if preferred, the area $A_4$ may be predeterminately larger than the area $A_3$ in order to provide a small differential holding force to maintain and urge said rod in its intermediate position, as shown in FIG. 2.

An inlet chamber 66 which is connected in open pressure fluid communication with the inlet port 35 at all times is provided in the housing counterbore 22 between the closure member 30 and the housing shoulder or valve seat 26, and the sealing engagement of the valve member 37 with said valve seat isolates said inlet chamber from an outlet chamber 67. The outlet chamber 67 is defined in the housing counterbore 21 by the valve member 37 and rod 53 and the sealing engagement of the rod seal 62 with the housing bore or valve seat 20, and said outlet chamber is connected in open pressure fluid communication with the outlet port 36 at all times. Another inlet chamber 68 is defined in the housing counterbores 23, 24 between the closure member 31 and the uni-directional valve member 63 in open pressure fluid communication with the inlet port 34 at all times. To complete the description of the control valve 11, it should be noted that the inlet port 34, the housing counterbores 23, 24, the control piston stepped bores 49, the uni-directional valve member 63, the housing bore and counterbore 20, 21 and the outlet port 36 defines a flow passage B through the housing 19 for service fluid pressure when the rod 53 is in its midposition.

OPERATION

With the component parts of the control valve 11 in their intermediate positions, as shown in FIG. 2, fluid pressure generated by the compressor 17 flows through the conduit 18 to the service reservoir 7 and therefrom through the conduit 13 and check valve 14 to the emergency reservoir 12. The emergency or supplied fluid pressure flows from the emergency reservoir 12 through the conduit 15 to the inlet port 35 and inlet chamber 66 of the control valve 11, and the service or separate supplied fluid pressure flows from the service reservoir 7 through the conduits 8, 10, the flow passage B of said control valve to establish an applied fluid pressure at the outlet port 36 thereof which then flows through the conduit 16 to the spring setting portion 3 of the brake actuator 2. The service fluid pressure in the flow passage B acts on the effective area $A_2-A_1$ of the control piston 44 to establish a control force, and when the magnitude of the service fluid pressure is in excess of a predetermined value, e.g. in the range of 20 to 45 p.s.i., the control force overcomes the opposing compressive force of the spring 57 to urge said control piston toward its inoperative position engaged with the housing shoulder and retainer 27, 51. Of course, when the magnitude of the service fluid pressure so applied to the spring setting portion 3 of the actuator 2 is in excess of another predetermined value, e.g. in the range of 90 to 120 p.s.i., said brake actuator is de-actuated and the brake (not shown) operatively connected therewith is de-energized.

In the event of the failure of the service fluid pressure due to compressor malfunction or a leak or the like in the system service branch 2, a fluid pressure differential is, of course, created across the unidirectional valve member 63 causing the lips 64, 65 thereof to sealably engage the sidewall of the housing recess 29 and the rod portion 60 to check-off or isolate the applied fluid pressure at the outlet port 36 and spring setting portion 3 of the brake actuator 2 from the supplied or service fluid pressure at the inlet port 34 which is in a failure condition, as previously mentioned. In this manner the check valve 63 maintains the magnitude of the applied fluid pressure in excess of the predetermined value, i.e. in the range of 90 to 120 p.s.i., in order to prevent the gradual or dragging energization of the brake (not shown) by the spring setting portion 3 of the brake actuator 2 in the event of a slow leak down of the supplied service fluid pressure, and the checking or isolation of the applied fluid pressure by the uni-directional valve 63 also serves to effect the spring set energization of the brake by said spring setting portion of said brake actuator at the desired or predetermined lower value, i.e. in the range of 20 to 45 p.s.i., of the supplied service fluid pressure in response to the automatic actuation of the control valve 11 by the control piston 44, as discussed hereinafter.

When the supplied service fluid pressure at the inlet port 34 fails or is reduced to the predetermined value, i.e. in the range of 20 to 45 p.s.i. and the unidirectional valve 63 functions to isolate the applied fluid pressure at the outlet port 36 from the supplied fluid pressure at the inlet port 34, as previously described, the control force is correspondingly reduced in value, and the compressive force of the spring 51 is effective to automatically move the control piston 44 leftwardly to drivingly engage the control piston end 48 with the rod abutment 61. Upon the engagement of the control piston end and rod abutment 48, 61, the control piston and rod 44, 53 are thereafter concertedly movable to their respective operative and "out" or venting positions. In the "out" position of the rod 53, the rod valve member 62 is moved leftwardly therewith into sealing engagement with the housing bore or valve seat 20, and the rod valve member 57 is disengaged from the piston member bore or valve seat 39 to thereby open the piston exhaust passage 39, 40 and establish pressure fluid communication therethrough between the outlet port 36 and the atmosphere wherein the applied fluid pressure is exhausted from the spring set portion 3 of the brake actuator 2 through the conduit 16, said outlet port, the outlet chamber 67, and the piston member stepped bores or exhaust passage 37, 38. At the same time, the flange 56 on the rod 53 is moved into abutting engagement with the housing shoulder 25 to limit the concerted movement of the control piston and rod 44, 53 and define the respective operative and "out" positions thereof. Upon such exhaustion of the applied fluid pressure, the spring set portion 3 of the brake actuator 2 is actuated to effect a spring set energization of the brake connected therewith. With the control piston and rod 44, 53 in their respective operative and "out" positions, the prevailing fluid pressure at the inlet port at 34 acts on the effective area $A_4$-$A_3$ of the rod 53 to establish a leftwardly directed holding force additive to the force of the spring 51 to maintain said rod in its "out" position.

Of course, it is readily apparent that the rod 53 can be selectively and independently manually moved to its "out" position in response to an operator force selectively applied to the knob 54, and such selective manual movement of said rod is relative to the control piston 44 in its inoperative position when the service fluid pressure is in excess of the predetermined value in the range of 20 to 45 p.s.i. As the rod 53 is selectively manually moved to its "out" position, the sealing engagement of the rod valve member 62 with the housing bore or seat 20 is effective to close the flow passage B and isolate the supplied fluid pressure at the inlet port 34 from the applied fluid pressure at the outlet port 36, and the disengagement of the rod valve member 57 from the piston stepped bore 39 effects the exhaustion of the applied fluid pressure and the actuation of the spring setting portion 3 of the brake actuator 2 in the same manner as previously described. With the control piston and rod 44, 53 urged to their respective operative and "out" positions by the compressive force of the spring 51, as described hereinbefore, the operator can, if desired, override the automatic actuation of the control valve 11 by the control piston and spring 44, 51. The override is accomplished by applying and maintaining a manual force on the exterior end 54 of the rod 53 to manually move said rod to its "in" position against the compressive force of the control piston spring 51, the valve spring 42, the holding force, and the force of the emergency fluid pressure in the inlet chamber 66 acting on the effective area of the piston member 37 which is defined by the sealing engagement of the seal 38 and valve 42 with the closure member bore 32 and valve seat 26, respectively. In the "in" position, the rod 53 is moved rightwardly to initially reengage the rod valve member 57 with the piston member stepped bore or seat 39 to close the exhaust passage 40 isolating the outlet port 36 from the atmosphere, and thereafter the rod free end 58 is drivingly engaged with the shoulder 41 of the piston member 37 to effect the concerted movement thereof toward a position disengaged from the housing valve seat 26 to establish open pressure fluid communication between the inlet and outlet ports 35, 36. With the valve member piston 37 disengaged from the housing valve seat 26, the supplied or emergency fluid pressure flows from the emergency reservoir 12 through the conduit 15, the inlet port 35 of the control valve 11, the inlet and outlet chambers 66, 67, the outlet port 36 and the conduit 16 to the spring set portion 3 of the brake actuator 2 to effect de-actuation thereof and the de-energization of the brake connected therewith. With the rod 53 in its "in" position, the aforementioned force of the emergency fluid pressure acting on the effective area of the piston 37 is, of course, eliminated, and the fluid pressure differential of the service and emergency fluid pressures acting across the unidirectional valve 63 effects the sealing engagement of the lips 64, 65 thereof with the sidewall of the recess 29 and the rod reduced portion 60 to check-off or isolate the emergency fluid pressure in the outlet chamber 67 from the service fluid pressure in the inlet chamber 68.

It is, of course, desirable to override the automatic actuation of the control valve 11 and de-energize the brake to permit movement of the vehicle to a safe or off-the-road parking position until the service branch 5 can be repaired and the system 1 is again operable. When the vehicle has been moved to a desirable location for the repair of the system 1, the manually applied force is removed from the rod 51 wherein the compressive forces of the springs 42, 51 are respectively operable to return the valve piston 37 to its position engaged with the housing valve seat 26 and to return the control piston and rod 44, 53 to their respective operative and "out" positions. Upon the return of the rod 53 to its "out" position, the rod valve member 62 is again reengaged with the housing bore or seat 20, and the rod valve member 56 is again disengaged from the valve member piston stepped bore 29 to exhaust the applied fluid pressure from the spring set portion 3 of the brake actuator 2 and again actuate said brake actuator and energize the brake, as previously described. Of course, it is again apparent that when the control piston 44 is urged to its inoperative position in response to the control force acting thereon, as previously mentioned, the rod 53 is selectively movable between its "out" and "in" positions independently of and relative to said control piston.

Figure 4:
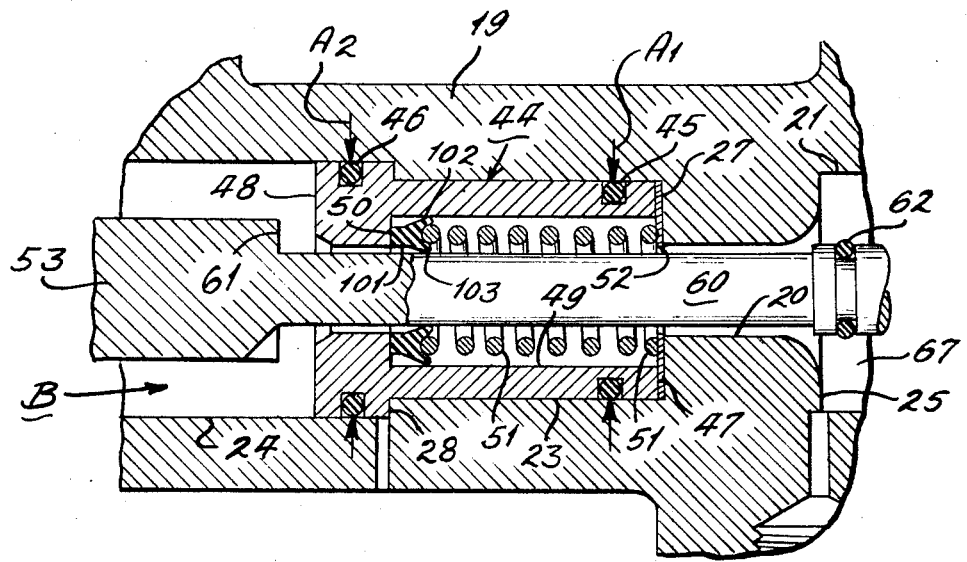
FIG. 4 is an enlarged fragmentary view illustrating an alternative uni-directional valve construction for use in the control valve of FIG. 2 in cross-section also embodied in the present invention.

Referring now to FIG. 4, an alternative unidirectional flow valve 101 is shown having substantially the same component parts functioning in the system 1 and control valve 11 in substantially the same manner as the previously described uni-directional flow valve 63 with the following exceptions.

The uni-directional flow or check valve member, such as the annular sealing cup 101, is provided in the control valve passage 49, and the spring 51 is engaged with said sealing cup urging it into seating engagement with the shoulder 50 of the control piston 44. The cup 101 is provided with annular, substantially axially extending inner and outer sealing lips 102, 103 which are normally sealably engaged with the rod portion 60 and the control piston passage 49 to permit the passage of fluid pressure through the flow passage B only in a direction from the inlet port 34 toward the outlet port 36.

It should be noted that the area $A_1$ is subjected to the applied fluid pressure at the outlet port 36 to establish a force acting on the control piston 44 in opposition to the force of the fluid pressure at the inlet port 34 acting on the area $A_2$; therefor, in the automatic actuation of said control piston to drive the rod 53 to its venting position upon the failure of the fluid pressure at said inlet port, as previously described, it is apparent that the force of the spring 51 can be lightened since it is assisted by the force of the applied fluid pressure at said outlet port acting on area $A_1$.

From the foregoing, it is now apparent that a novel fluid pressure system 1 and control valve 11 therefor meeting the objects and advantages set out hereinbefore, as well as others, are provided and that changes as to precise configurations, shapes and details set forth in the disclosure by way of illustration may be made by those skilled in the art without departing from the spirit of the invention.

The embodiments of the invention in which an exclusive property or privilege is claimed are defined as follows:

1. A control valve comprising a housing, first and second inlet ports and an outlet port in said housing, first and second valve seats in said housing between said first inlet port and outlet port and between said second inlet port and outlet port, respectively, a first valve normally urged into engagement with said first valve seat interrupting pressure fluid communication between said first inlet port and said outlet port, an exhaust passage in said first valve between said outlet port and the atmosphere, a third valve seat on said first valve about said exhaust passage, a valve stem reciprocally movable in said housing and extending through said second valve seat including a second valve normally disengaged from said second valve seat to establish pressure fluid communication between said first inlet port and said outlet port, and a third valve normally engaged with said third valve seat closing said exhaust passage, said valve stem being manually movable in response to an applied force thereon in one direction to engage said second valve with said second valve seat interrupting pressure fluid communication between said second inlet port and said outlet port and disengage said third valve from said third valve seat venting said outlet to the atmosphere, an abutment on said stem for driving engagement with said first valve, said stem also being movable in a direction opposite to the one direction to drivingly engage said abutment with said first valve and concertedly move said first valve toward a position disengaged from said first valve seat to establish pressure fluid communication between said first inlet port and said outlet port, a sealing cup having inner and outer lips sealably engaged between said housing and stem and disposed in said housing between said second inlet port and said outlet port to isolate said second inlet port when said first valve is disengaged from said first valve seat.

* * * * *